(12) United States Patent
Karisalmi et al.

(10) Patent No.: US 10,767,312 B2
(45) Date of Patent: Sep. 8, 2020

(54) METHOD FOR PRODUCING PAPER, BOARD OR THE LIKE

(71) Applicant: Kemira Oyj, Helsinki (FI)

(72) Inventors: Kaisa Karisalmi, Helsinki (FI); Tom Lundin, Åbo (FI); Mikko Virtanen, Helsinki (FI); Antti Laukkanen, Helsinki (FI); Jason McKee, Helsinki (FI)

(73) Assignee: Kemira Oyj, Helsinski (FI)

( * ) Notice: Subject to any disclaimer, the term of this patent is extended or adjusted under 35 U.S.C. 154(b) by 34 days.

(21) Appl. No.: 16/062,710

(22) PCT Filed: Dec. 15, 2016

(86) PCT No.: PCT/FI2016/050876
§ 371 (c)(1),
(2) Date: Jun. 15, 2018

(87) PCT Pub. No.: WO2017/103335
PCT Pub. Date: Jun. 22, 2017

(65) Prior Publication Data
US 2019/0309476 A1   Oct. 10, 2019

(30) Foreign Application Priority Data

Dec. 15, 2015   (FI) ..................... 20155952

(51) Int. Cl.
| | |
|---|---|
| *D21H 11/18* | (2006.01) |
| *D21H 11/12* | (2006.01) |
| *D21H 17/21* | (2006.01) |
| *D21H 17/33* | (2006.01) |
| *D21H 21/20* | (2006.01) |
| *D21H 21/18* | (2006.01) |
| *C08L 1/02* | (2006.01) |

(52) U.S. Cl.
CPC ............. *D21H 11/18* (2013.01); *D21H 11/12* (2013.01); *D21H 17/21* (2013.01); *D21H 17/33* (2013.01); *D21H 21/18* (2013.01); *D21H 21/20* (2013.01); *C08L 1/02* (2013.01)

(58) Field of Classification Search
USPC ........................................................ 162/127
See application file for complete search history.

(56) References Cited

U.S. PATENT DOCUMENTS

| | | | |
|---|---|---|---|
| 5,964,983 | A | 10/1999 | Dinand et al. |
| 6,074,856 | A | 6/2000 | Wong et al. |

FOREIGN PATENT DOCUMENTS

| | | |
|---|---|---|
| EP | 0644293 A1 | 3/1995 |
| EP | 1433898 A1 | 6/2004 |
| JP | 2015014078 A | 1/2015 |
| WO | 0047628 A2 | 8/2000 |
| WO | 2011068457 A1 | 6/2011 |
| WO | 2014029917 A1 | 2/2014 |
| WO | 2014072912 A1 | 5/2014 |
| WO | 2014147293 A1 | 9/2014 |
| WO | 2014154937 A1 | 10/2014 |
| WO | 2015166141 A1 | 11/2015 |
| WO | 2016027006 A1 | 2/2016 |

OTHER PUBLICATIONS

European Patent Office, Communication about Third Party Observation dated Apr. 12, 2019, European patent application No. 16819964.4, 4 pages.
Polymin SK, Sep. 18, 1995, http://legacy.library.ucsf.edu/tid/kvc40d00/pdf, 1 page.
SNF Core Product Guide, Effective Apr. 15, 2014, Confidential for Internal SNF use only, 16 pages.
Powder Beads, SNF Floerger, 60 pages.
Finnish Patent and Registration Office, Search Report of FI20155952, dated Jul. 7, 2016.

*Primary Examiner* — Mark Halpern
(74) *Attorney, Agent, or Firm* — Berggren LLP

(57) ABSTRACT

The invention relates to a method for producing paper, board or the like. The method comprises obtaining a thick stock comprising cellulose fibres, forming a fibrous web and drying of drying the fibrous web. A strength agent system, which comprises at least one synthetic or natural polymer, or their mixture, and microfibrillated parenchymal cellulose material originating from non-wood sources, is added to the thick stock. The invention relates also to paper or board produced by the method.

20 Claims, 1 Drawing Sheet

METHOD FOR PRODUCING PAPER, BOARD OR THE LIKE

PRIORITY

This application is a U.S national application of PCT-application PCT/FI2016/050876 filed on Dec. 15, 2016 and claiming priority of Finnish application FI 20155952 filed on Dec. 15, 2015, the contents of all of which are incorporated herein by reference.

The present invention relates to a method for producing paper, board or the like according to preambles of the enclosed independent claims.

Cellulose forms a part of the cell wall structures in plant material, where it reinforces a matrix of hemicellulose and either pectin or lignin. In primary cell walls of parenchyma cellulose forms a flexible membrane layer together with other polysaccharides such as pectin and hemicelluloses. Parenchyma forms e.g. pith of stems and fruit pulp. Wood species has also sclerenchyma, which comprise a secondary wall structure, which is formed after the cell has ceased growing. The secondary wall structure of sclerenchyma provides rigidity and strength for the plant. In the secondary cell wall the cellulose is found as layers of cellulose microfibrils. The fibrils are mostly uniformly aligned within each layer and tightly attached to each other by hydrogen bonds and covalent bridges to lignin structures. Due to the variations in the cellular structure and composition the mechanical properties of the different plant parts vary significantly. For example, Young's modulus and compressive strength for parenchyma from potato or apple is <0.3 GPa and <0.3 MPa, respectively, while woods such as pine or spruce show Young's modulus about 10 GPa and compressive strength approximately 90 MPa, when loaded along the grain.

Microfibrillated cellulose comprises liberated semi-crystalline nanosized cellulose fibrils having high length to width ratio. A typical nanosized cellulose fibril has a width of 5-60 nm and a length in a range from tens of nanometres up to several hundred micrometres. Microfibrillated cellulose (MFC) is produced from various fibre sources comprising cellulosic structures, such as wood pulp. As the secondary cell walls of wood are rich in cellulose, wood pulp is commonly used as raw material for microfibrillated cellulose or nanocellulose. However, the liberation of microfibrils from the secondary cell wall structure may be difficult. Fibrillation process is complicated, and often chemical pretreatment is necessary in order to obtain acceptable fibrillation degree. The harsh fibrillation may damage the fibrils and is commonly an expensive and energy consuming process.

Microfibrillated cellulose has been used in paper and board making as an additive. However, the high price of the microfibrillated cellulose has restricted its use in large scale.

The object of the present invention is to minimize or even eliminate the disadvantages existing in prior art.

One object of the present invention is to provide a, method for increasing the strength properties, such as Z-strength, burst strength, SCT strength, of produced paper or board.

Another object of the present invention is to provide a paper or board product with improved strength properties.

These objects are achieved by the features disclosed in the independent claims and the invention is defined by the features of the enclosed independent claims. Some preferred embodiments of the present invention are presented in the dependent claims. The features recited in the dependent claims are mutually freely combinable unless otherwise explicitly stated.

The exemplary embodiments presented in this text and their advantages relate by applicable parts to the method, use as well as the product according to the invention, even though this is not always separately mentioned.

Typical method according for producing paper, board or the like, comprises
  obtaining a thick stock comprising cellulose fibres,
  forming a fibrous web from the stock,
  adding to the thick stock a strength agent system, which comprises at least one synthetic or natural polymer, or their mixture, and microfibrillated parenchymal cellulose material originating from non-wood sources, and
  drying the fibrous web.

Typical use of microfibrillated parenchymal cellulose material originating from non-wood sources is as strength agent in manufacture of paper, board or the like.

Typical paper or board product according to the present invention has a density in the range of 150-800 kg/m³ and is produced by a method according to the invention.

Figure 1:
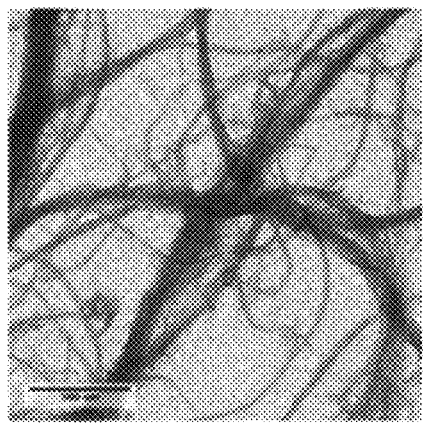
FIG. 1 shows a microfibrillated parenchymal cellulose material which is based on potato pulp.

Now it has been surprisingly found out that various key strength parameters of paper or board can be increased by addition of a strength agent system comprising at least one polymer and microfibrillated parenchymal cellulose material to the thick stock. The interaction of the polymer and microfibrillated parenchymal cellulose material provides effective and unexpected increase in strength properties of the produced paper or board. Furthermore, it is possible to improve even more than one of the desired strength parameters simultaneously. It has been observed that the strength improvement which is achieved by using the strength agent system comprising a polymer and microfibrillated parenchymal cellulose is as good, or even better than the results achieved by using a conventional microfibrillated material produced from secondary wall structures of woods. This is surprising in view of the strength properties of parenchyma and sclerenchyma before microfibrillation.

The use of microfibrillated parenchymal cellulose offers also a sustainable and environmentally benign alternative for improving the strength properties of paper and board products. First, the production of microfibrillated parenchymal cellulose material requires less energy than fibrillation of wood-based material. Secondly, it is possible to use raw material that would otherwise be often disregarded as waste. The microfibrillated parenchymal cellulose can be produced to a high solids content product, which makes it economical to store and transport. Furthermore, both synthetic polymer of natural polymer can be used in the strength agent system of the present invention, which increases its versatility in different paper and board making processes.

The strength agent system according to the present invention may also provide improved surface properties for the final paper or board, such as improved gas barrier properties.

In this context the term "microfibrillated parenchymal cellulose material" means microfibrillated material that is obtained by fibrillating plant-based cellulose rich material comprising essentially primary cell wall structures, i.e. parenchymal cells. The material thus comprises cellulose fibrils originating from primary cell wall structures, i.e. parenchymal cells. Parenchyma is here understood as basic tissue of plants, containing cells with thin primary cell walls. The cortex and pith of the stem, the internal layers of leaves, and the soft parts of fruits and vegetables are made of parenchyma. Parenchyma cells remain alive at maturity, and perform various functions, such as water storage, replacement of damaged tissue, and physical support of plant structures. The parenchymal cellulose material, which is microfibrillated, is obtained from non-wood sources, which preferably comprises thin and flexible primary cell walls and is devoid of secondary cell wall structures.

The microfibrillated parenchymal cellulose material comprises parenchymal cellulose fibrils originating from any suitable plant source, comprising plant species that predominantly comprise parenchyma cell types and/or where the majority of the cellulose is located in primary cell walls. According to one embodiment of the invention the microfibrillated parenchymal cellulose material originates from vegetables, such as sugar beet pulp, potato pulp, cassava pulp, sweet potato; fruits, such as citrus peel, fruit pulp; cellulose pith, such as bagasse pith, corn pith, bamboo pith; and any mixtures thereof. Especially suitable raw materials are sugar beet pulp, bagasse pith fraction, potato pulp, cassava pulp and mixtures thereof. According to one preferable embodiment the microfibrillated parenchymal cellulose material comprises parenchymal cellulose fibrils originating from sugar beet pulp.

In certain plant species, primary and secondary cell wall structures co-exist. For example, in various grasses the plant structure is composed of a rigid outer shell, which comprises macroscopic cellulose fibres with a thick secondary cell wall, and of a soft internal core, i.e. a pith tissue, which comprises predominantly parenchyma cells with a thin primary wall. Examples of plants from which the cellulose pith can be easily isolated comprise sugar cane, bamboo, corn, various grass and straw structures, e.g. wheat, barley, rye, oats, rice, sabai, albardine, esparto, etc. According to one embodiment of the invention the microfibrillated parenchymal cellulose material originates from these raw materials. Especially suitable raw materials are pre-fractionated cellulose pith side-streams from paper or board industry, which use non-wood fibres as the main fibre source.

According to one embodiment soluble polysaccharides, such as pectin, are removed from the used raw material before the mechanical treatment of microfibrillation. Removal of excess of soluble polysaccharides reduces the risk of microbiological activity. Non-wood raw material that predominantly comprise parenchyma cell types and from which soluble polysaccharides, such as pectin, have been at least partially removed, e.g. by raw material producer, are especially suitable raw materials for the microfibrillated parenchymal cellulose material. Examples of these raw materials are parenchymal cellulose rich side streams from pectin factories using e.g. citrus peel, apple residuals, or sugar beet as a pectin source. Correspondingly, parenchymal cellulose rich side streams from potato or cassava based starch factories are especially suitable raw materials.

Many of the raw materials mentioned in the preceding paragraphs are easily and abundantly available as by-products, waste or residuals of food product, sugar and/or starch processing or production. They provide an economically advantageous raw material.

Microfibrillated parenchymal cellulose material comprises parenchymal cellulose, minerals, salts, sugars, as well as anionic binding polymers, such as pectin and hemicellulose, and their hydrolysis products. According to one embodiment of the invention the microfibrillated parenchymal cellulose material comprises at least 50 weight-%, preferably at least 60 weigh-%, more preferably at least 70 weigh-%, even more preferably at least 80 weight-%, of parenchymal cellulose, calculated from the dry solids content of the material. Preferably the microfibrillated parenchymal cellulose material is free from cellulose fibrils originating from secondary cell wall structures.

Microfibrillated parenchymal cellulose material which is suitable for use as a component of the strength agent system can be obtained by any suitable mechanical treatment, for example by fibrillation in a grinder, comminutor, rotor-stator mixer or grinder, rotor-rotor mixer or grinder, homogenizer, fluidizer or ultrasonic disintegrator. According to one embodiment a grinder, rotor-rotor mixer, rotor-rotor grinder or high-shear rate grinder, such as Atrex® grinder, is used in the mechanical treatment for producing microfibrillated parenchymal cellulose material. Grinders are preferable alternatives because they are easy to use, and they are less prone for clogging. In general, the production of microfibrillated parenchymal cellulose material from above listed raw materials requires relatively little energy and/or force, which makes the production easier and increases the overall sustainability of the process.

The microfibrillated parenchymal cellulose material is obtained as cellulose microfibrils or cellulose microfibril bundles. The length of the microfibrils in the microfibrillated material is typically >1 µm, preferably 1-200 µm, even more preferably 10-100 µm, most preferably 10-60 µm. The diameter of individual microfibrils may be in the range of 2-200 nm, preferably 2-100 nm, more preferably 4-70 nm, even more preferably 5-40 nm. Microfibrillated parenchymal cellulose material may often comprise bundles of 10-50 microfibrils, the diameter of microfibril bundles being normally <1 µm.

It is possible to treat the parenchymal cellulose raw material before the mechanical treatment, e.g. by washing, purifying and/or bleaching. According to one embodiment the cellulose raw material is subjected to alkaline, neutral or acidic wash before the mechanical treatment. By washing the cellulose raw material at alkaline or acidic pH, it is possible to fully or partially detach binding polymers, such as pectin and hemicelluloses, from the primary cell wall. This makes the fibrillation process easier. The washing can be performed by a batch-type or a continuous process. Furthermore, washing reduces, inter alia, the possible colour of the microfibrillated parenchymal cellulose material.

According to one preferable embodiment the raw material for microfibrillated parenchymal cellulose material is only subjected to alkaline wash with succeeding optional neutral wash before microfibrillation by mechanical treatment. It is assumed that the washing steps remove residual sugars, as well as anionic binding polymers, such as pectin and hemicellulose, from the material.

However, according to another embodiment of the present invention the microfibrillated parenchymal cellulose material is obtained by mechanical treatment, such as homogenization, without any preceding treatment steps, which are selected from oxidation, extraction and/or washing. According to one embodiment the microfibrillated material is obtained by mechanical treatment, such as homogenization, without any preceding treatment steps, which are selected from oxidation and/or extraction. It has been observed that the untreated raw material provides microfibrillated parenchymal cellulose material, which may provide an enhanced effect when used together with at least one polymer in a strength agent system. Without being bound by a theory, it is presently assumed that the untreated microfibrillated parenchymal cellulose material contains more heterogeneous polymeric material which originates from the raw material and provides an increased binding effect when present in the strength agent composition according to the present invention.

Especially, the microfibrillated parenchymal cellulose material is preferably free of any chemical modification steps, performed before or after microfibrillation, where chemical groups, inorganic deposits, chemical coatings or layers are attached or incorporated to the fibrils or on their surface. Microfibrillated parenchymal cellulose material is thus free from derivatization by steric or charged groups.

Biocide is preferably added in the microfibrillated parenchymal cellulose material. The biocide may be added in amount of 1-400 ppm, preferably 150 ppm-350 ppm.

According to one embodiment of the invention the microfibrillated parenchymal cellulose material can be concentrated and/dried, for example to a solids content at least 10 weight-%, preferably in the range of 12-95 weight-%, more preferably in the range of 20-95 weight-%. The concentration and/or drying of the microfibrillated parenchymal cellulose material can be performed before fibrillation, or preferably, after the microfibrillated parenchymal cellulose material is produced by mechanical treatment. Both alternatives produce concentrated microfibrillated material, which is easy to store and transport. Before its used as a component in the strength agent system, the dried or concentrated microfibrillated cellulose can be redispersed into water, to suitable use concentration, for example 0.2-5 weight-%, preferably 0.3-4 weight-%, more preferably 0.5-3 weight-%.

According to one embodiment of the invention the microfibrillated parenchymal cellulose material has
- a Brookfield viscosity of at least 10 Pas, preferably at least 100 Pas, measured at concentration of 1.0 weigh-% at 100 rpm shear rate, and/or
- a turbidity value less than 1000 NTU, preferably in the range of 100-700 NTU, measured at 0.1 weight-% concentration, and/or
- a net charge in the range of −0.001−−1.99 meq/g, preferably −0.01−−1.50 meq/g, more preferably −0.05−−1.0 meq/g, at pH 7.5.

In general, high viscosity and low turbidity indicate good degree of fibrillation of the parenchymal cellulose material. According to one embodiment of the invention the microfibrillated parenchymal cellulose material has a Brookfield viscosity in the range of 0.01-10 000 Pas, preferably 10-10 000 Pas, more preferably 100-10 000.Pas, even more preferably 200-850 measured at concentration of 1.0 weigh-% at 100 rpm shear rate, using Brookfield DV3T viscosimeter (Brookfield Engineering Laboratories, Middleboro, USA) equipped with a vane geometry (V-72).

According to one preferable embodiment the Brookfield viscosity of the microfibrillated parenchymal cellulose material may be in the range of 500-2000 Pas, preferably 800-1400 Pas, more preferably 900-1300 Pas, measured with Brookfield DV3T viscosimeter (Brookfield Engineering Laboratories, Middleboro, USA) equipped with a vane geometry (V-72), at 50 rpm.

Preferably the microfibrillated parenchymal cellulose material shows shear-thinning behaviour, i.e. its viscosity decreases at increasing shear rate. Shear thinning behaviour improves the mixing of the microfibrillated parenchymal cellulose material with the synthetic and/or natural polymer as well as with the fibres in the stock, and thus uniformity of the formed strength composition.

According to one embodiment of the invention the turbidity of the microfibrillated parenchymal cellulose material may be in the range 375-525 NTU, preferably 490-510 NTU, measured with HACH P2100 turbidimeter. When measured, the material sample is diluted with water to a concentration of 0.1 weight-%, and the sample is agitated for 10 min before the measurement followed by degassing in vacuum to remove the entrapped air bubbles in the sample. The temperature was adjusted to 20° C. prior to the measurement where the emission of light scattered from particles of a sample was detected.

The strength agent system according to the present invention comprises in addition to microfibrillated parenchymal cellulose material at least one natural or synthetic polymer or their mixture. The strength agent system may also comprise a plurality of natural and/or synthetic polymers. The choice between natural polymer and synthetic polymer depends on a number of factors, such as their effectiveness, economical aspects, the effect on machine runnability and productivity, ease of use, product availability and shelf life. Because the present strength agent composition can use both synthetic polymer or natural polymers, or their mixtures, the degrees of freedom in selection of the polymer component are unexpectedly increased.

The at least one synthetic and/or natural polymer may be added to the microfibrillated parenchymal cellulose material before, after, or during the mechanical treatment which produces the microfibrillar parenchymal cellulose material.

According to one preferable embodiment the natural or synthetic polymer is cationic. In the context of the present application it is understood that a cationic polymer may also contain local anionic charges as long as its net charge of the polymer is cationic. Cationic polymer improves the retention of the micofibrillated parenchymal cellulose material on the surface of the fibres in the stock, because both the microfibrillated material and the fibre surface comprise anionically charged sites. The cationic polymer creates and effective net of bonds between the microfibrillated material and the fibre surfaces so that the key strength properties of the final paper or board product are enhanced.

According to one embodiment of the invention the strength agent system comprises a natural polymer which is selected from a group consisting of cationic or amphoteric starch, chitin, guargum, carboxymethyl cellulose, and any mixture thereof. For use in strength agent system the starch may be cationised by any suitable method. Preferably starch is cationised by using 2,3-epoxypropyltrimethylammonium chloride or 3-chloro-2-hydroxypropyl-trimethylammonium chloride, 2,3-epoxypropyltrimethylammonium chloride being preferred. It is also possible to cationised starch by using cationic acrylamide derivatives, such as (3-acrylamidopropyl)-trimethylammonium chloride. The degree of substitution (DS) indicates the number of cationic groups in the starch on average per glucose unit. Preferably the natural polymer is cationic starch with a substitution degree in the range of 0.01-0.3, preferably 0.02-0.1, more preferably 0.03-0.6.

According to one embodiment the cationic starch is non-degraded, which means that the starch has been modified solely by cationisation, and its backbone is non-degraded and non-cross-linked.

According to one embodiment the cationic starch may be any suitable cationic starch used in paper making, such as potato, rice, corn, waxy corn, wheat, barley or tapioca starch, preferably corn starch or potato starch. Typically the amylopectin content of the cationic starch is in the range of 65-90%, preferably 70-85%.

According to one embodiment at least 70 weight-% of the starch units of the cationic starch have an average molecular weight (MW) over 20 000 000 g/mol, preferably 50 000 000 g/mol, more preferably 100 000 000 g/mol.

The polymer in the strength agent system may also or alternatively be a synthetic polymer selected from cationic polyacrylamide (C-PAM), glyoxalated polyacrylamide (G-PAM), amphoteric polyacrylamide, polydiallyldimethylammonium chloride (poly-DADMAC), polyacrylic amide (PAAE), polyvinyl amine (PVAm), polyethylene oxide (PEO), polyethyleneimine (PEI) or any mixture of two or more of these polymers.

The average molecular weight of the synthetic polymer may be in the range 100 000-20 000 000 g/mol, typically 300 000-8 000 000 g/mol, more typically 300 000-1 500 000 g/mol. The molecular weight of the polymer is preferably high enough to ensure efficient adsorption and hydrogen bonding between the different components, but not so high that the polymer would cause flocculation in the system.

In this application the value "average molecular weight" is used to describe the magnitude of the polymer chain length. Average molecular weight values are calculated from intrinsic viscosity results measured in a known manner in 1N NaCl at 25° C. The capillary selected is appropriate for the viscosity value to be measured, and in the measurements of this application an Ubbelohde capillary viscometer with constant K=0.005228 was used. The average molecular weight is then calculated from intrinsic viscosity result in a known manner using Mark-Houwink equation $[D]=K\cdot M^a$, where [D] is intrinsic viscosity, M molecular weight (g/mol), and K and a are parameters given in Polymer Handbook, Fourth Edition, Volume 2, Editors: J. Brandrup, E. H. Immergut and E. A. Grulke, John Wiley & Sons, Inc., USA, 1999. In the case the molecular weight, as determined by intrinsic viscosity, was less than 1000 000, a GPH HPCL-SEC analysis with PEO reference polymer calibration was used.

The synthetic polymer is a cationic synthetic polymer which has a charge density of 0.5-2 meq/g, preferably 0.3-1.9 meq/g, more preferably 0.4-1.35 meq/g.

According to one preferable embodiment the synthetic polymer is a cationic synthetic polymer. Especially the synthetic polymer may be a copolymer of methacrylamide or acrylamide and at least one cationic monomer. The cationic monomer may be selected from a group consisting of methacryloyloxyethyl-trimethyl ammonium chloride, acryloyloxyethyltrimethyl ammonium chloride, 3-(methacrylamido) propyltrimethyl ammonium chloride, 3-(acryloylamido) propyltrimethyl ammonium chloride, diallyldimethyl ammonium chloride, dimethylaminoethyl acrylate, dimethylaminoethyl methacrylate, dimethylamino-propylacrylamide and dimethylaminopropylmethacrylamide.

The strength agent system may comprise at least 50 weight-%, preferably at least 60 weight-%, more preferably at least 70 weight-%, even more preferably at least 80 weight-%, of microfibrillated parenchymal cellulose material, calculated from the dry solids content of the system. According to one preferable embodiment the strength agent system may comprise 50-99.9 weight-%, preferably 70-99.9 weight-%, more preferably 80-99.5 weight-%, even more preferably 85-90 weight-%, of microfibrillated parenchymal cellulose material, calculated from the dry solids content. According to one embodiment the strength agent system may comprise 50-90 weight-%, preferably 60-90 weight-%, of microfibrillated parenchymal cellulose material, calculated from the dry solids content.

According to one embodiment of the invention at least one cationic polymer and the microfibrillated parenchymal cellulose material of the strength agent system can be added simultaneously to the thick stock. They can be added simultaneously but separately, or as a ready-made pre-mix. According to a preferable embodiment the at least one cationic polymer and the microfibrillated parenchymal cellulose material of the strength agent system are added to the thick stock as a ready-made pre-mix.

According to another embodiment of the invention the at least one cationic polymer and the microfibrillated parenchymal cellulose material of the strength agent system are added separately and sequentially to the thick stock. If the components of the strength agent composition are added to the thick stock sequentially, an effective mixing between the additions is preferred. At least one polymer may be added to the thick stock before or after the addition of the microfibrillated parenchymal cellulose material. Preferably the microfibrillated parenchymal cellulose material of the strength agent system is added to the thick stock before the addition of at least one polymer of the strength agent system. For example, the microfibrillated parenchymal cellulose material may be added 60 seconds before the drainage, and the synthetic or natural polymer may be added after the addition of the microfibrillated parenchymal cellulose material, for example 30 seconds before the drainage.

The strength agent system may be added to the thick stock, which has a consistency in the range of 2-6 weight-%, preferably 3-5 weight-%.

The strength agent system is added in such amount to the thick stock that the microfibrillated parenchymal cellulose material is added in amount of 1-100 kg, preferably 5-70 kg, more preferably 10-50 kg, even more preferably 15-50 kg, given as dry per ton of dry solids of the fibre stock.

According to one embodiment of the invention a cationic retention polymer is added to the stock after the addition of the strength agent system. Preferably the cationic retention polymer is added just before the drainage. The cationic retention polymer may be cationic polyacrylamide having an average molecular weight of 4 000 000-18 000 000 Da, preferably 4 000 000-12 000 000 Da, more preferably 7 000 000-10 000 000 Da, and/or has a charge density of 0.2-2.5 meq/g, preferably 0.5-1.5 meq/g, more preferably 0.7-1.2 meq/g.

The stock comprising cellulose fibres may be obtained by using furnish from kraft pulping, chemithermomechanical (CTM) pulping or by repulping recycled fibres.

According to one embodiment of the invention the paper or board product comprises at least a first surface layer, middle layer, and a second surface layer, which are attached to each other, and where at least one of the layers comprises microfibrillated parenchymal cellulose material originating from non-wood sources.

According to one embodiment of the invention at least the strength agent system comprising at least one cationic polymer and the microfibrillated parenchymal cellulose material can be added to one or several layers of a paper or board product by using multilayer technique described in WO 2014/029917.

EXPERIMENTAL

Some embodiments of the present invention are described in the following non-limiting examples.

Example 1

Production of Fibrillated Parenchymal Cellulose Based on Potato Pulp or on Sugar Beet Pulp Batch Extraction Followed by Fibrillation:

Concentrated potato pulp from a starch factory was purified in a water or lye wash. Here, the potato pulp was taken to a 25 g/L suspension and heated to 60-90° C. Alternatively compressed sugar beet pulp with 26 weight-% dry content from a sugar factory was first washed in lye. Here, pulp was taken to a 25 dry g/L suspension and heated to 70-80° C. For both potato and sugar beet NaOH was added thereafter with gentle stirring. During this time, the hydrated potato/sugar beet clippings lost their solid-like morphology and broke down into a dark brown viscous mass. After 120 minutes of stirring, the reaction was cooled down and optionally filtrated through a steel screen with 0.25 mm pore size. The lye-washed pale grey cellulosic potato mass was further washed with copious amounts of water. The obtained material was dispersed into water and fibrillated using a high speed grinder or homogenizer at pH 8-10. The raw material, extraction parameters and fibrillation method for different samples were as follows:

RefMFC: Wood based MFC produced via homogenization, used as reference and produced according to WO 2015/166141.

MFC 35: The sample was neutral extracted dried potato, extracted at a constant pH of 7. The sample was fibrillated with Atrex®, 4 pass at 1800 rpm, after washing the product with copious amounts of water. The sample contains 4 ppm biocide.

MFC 37: The sample was base extracted dried potato, extracted at a constant NaOH concentration of 0.05 M. The sample was fibrillated with Atrex®, 4 pass at 1800 rpm, after washing the product with copious amounts of water. The sample contains 4 ppm biocide.

MFC 38: The sample was base extracted dried potato, extracted at a constant NaOH concentration of 0.05 M. The sample was fibrillated with Atrex®, 4 pass at 1800 rpm, after washing the product with copious amounts of water. The sample contains 4 ppm biocide.

MFC 41: The sample was base extracted pelleted sugar beet, extracted at 0.05 M NaOH (4% solids). The sample was fibrillated with Atrex®, 4 pass at 1800 rpm. The sample contains 200 ppm of Fennocide BZ26 as a biocide. Solids content 3.7%.

MFC 42: The sample was base extracted potato fibre, extracted at 0.05 M NaOH (4% solids). The sample was fibrillated with Atrex®, 4 pass at 1800 rpm. The sample contains 200 ppm of Fennocide BZ26 as a biocide. Solids content 3.4%.

Continuous Counter Current Extraction Followed by Fibrillation:

MFC 43: The sample was base extracted fresh sugar beet clippings, extracted by using a counter current reactor. The extraction was done by adding the clippings as they were received (24%). This sample was extracted using a steady flow of 0.3 M NaOH. The sample was then washed with hot water, again, using the counter current reactor. After the hot water wash, the sample pH was 10 and solids content was roughly 10%. The sample was fibrillated with Atrex®, 4 pass at 1800 rpm. After fibrillation (4 pass), the solids content was roughly 20%. The sample contains 200 ppm of Fennocide BZ26 as a biocide. Solids content 20.5%.

MFC 46: The sample was base extracted fresh sugar beet clippings, extracted by using a counter current reactor. The extraction was done by adding the clippings as they were received (24%). This sample was extracted using a steady flow of 0.5 M NaOH. The sample was then washed with hot water, again, using the counter current reactor. After the hot water wash, the sample pH was 10 and solids content was roughly 10%. The sample was fibrillated with Atrex®, 4 pass at 1800 rpm. After fibrillation (4 pass), the solids content was roughly 20%. The sample contains 200 ppm of Fennocide BZ26 as a biocide. Solids content 19.3%.

The raw material information, extraction parameters, and fibrillation methods are summarized in Table 1.

The resulting microfibrillated parenchymal cellulose material was characterized using turbidity and viscosity measurements, and the characteristic values are summarised in Table 2.

TABLE 1

Summary of the raw material information, extraction parameters, and fibrillation methods.

| Sample | Raw material/form | NaOH conc. (mol/l) | Extraction method | Fibrillation method |
|---|---|---|---|---|
| MFC 35 | Sugar beet pulp/dry pellet | 0 | Batch | Atrex 4 passages, 3.6% |
| MFC 37 | Potato pulp/dry powder | 0.05 | Batch | Atrex 4 passages, 3.6% |
| MFC 38 | Potato pulp/dry powder | 0.05 | Batch | Atrex 4 passages, 3.6% |
| MFC 41 | Sugar beet pulp/dry pellet | 0.05 | Batch | Atrex 4 passages, 3.6% |
| MFC 42 | Potato pulp/dry powder | 0.05 | Batch | Atrex 4 passages, 3.6% |
| MFC 43 | Sugar beet pulp/Fresh cutting | 0.3 | Continuous | Atrex 4 passages, 10% |
| MFC 46 | Sugar beet pulp/Fresh cutting | 0.5 | Continuous | Atrex 4 passages, 10% |

TABLE 2

Summary of the turbidity and viscosity results.

| Sample | Turbidity (NTU) | Viscosity 50 rpm (Pas) | Viscosity 100 rpm (Pas) |
|---|---|---|---|
| MFC 35 | 188 | — | 115 |
| MFC 37 | 175 | — | — |
| MFC 38 | 249 | 309 | 198 |
| MFC 41 | 402 | 648 | 421 |
| MFC 42 | 189 | 955 | 610 |
| MFC 43 | 229 | 262 | 172 |
| MFC 46 | 268 | 442 | 260 |

Figure 2:
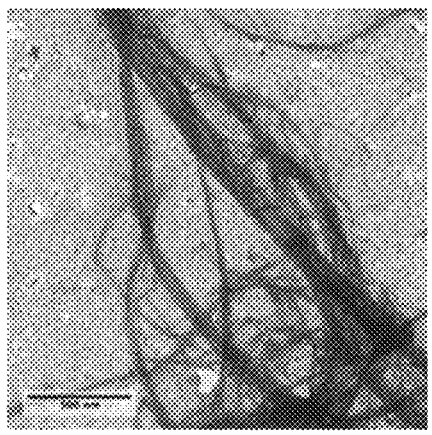
FIG. 2 shows a microfibrillated parenchymal cellulose material which is based on sugar beet pulp.

Transmission electron microscopy was used to evaluate dimensions of a typical product. The microfibrillated parenchymal cellulose material based on potato pulp is shown in FIG. 1 and the microfibrillated parenchymal cellulose material based on sugar beet pulp is shown in FIG. 2.

Example 2

Characterization Methods

The viscosity of the microfibrillated parenchymal cellulose material was measured by Brookfield DV3T viscosimeter (Brookfield Engineering Laboratories, Middleboro, USA) equipped with a vane geometry (V-72, diameter 21.67 mm, length 43.38 mm). The material was diluted with water to a concentration of 1.0 weight-%, and agitated for 10 min before degassing in vacuum to remove the entrapped air bubbles. The temperature was adjusted to 20° C. prior to viscosity measurement. The viscosity of the samples was measured at 50 and 100 rpm shear rates.

Turbidity of dilute aqueous dispersions of microfibrillated parenchymal cellulose material was measured with HACH P2100 turbidimeter. The material was diluted with water to a concentration of 0.1 weight-%, and agitated for 10 min before degassing in vacuum to remove the entrapped air bubbles. The temperature was adjusted to 20° C. prior to the turbidity measurement where the emission of light scattered from particles of a sample was detected.

Example 3

Strength Compostions for OCC and Kraft Pulps

Three different samples of microfibrillated parenchymal cellulose material were tested as component for strength compositions comprising also synthetic strength aid polymers with OCC (Old Corrugated Cardboard) and Kraft pulps. Both Dynamic and Rapid Kothen sheet formers were used.

TABLE 3

Strength and retention polymers used in the tests.

| Abbreviation | Tradename | Supplier | Purpose |
|---|---|---|---|
| Chem1 | Fennobond 3300 | Kemira Oyj | Strength aid |
| Chem2 | Fennobond 46 | Kemira Oyj | Strength aid |
| Chem3 | Fennopol K3400P | Kemira Oyj | Retention chemical |
| Chem4 | Fennopol K4230P | Kemira Oyj | Retention chemical |
| Chem5 | Fennosil 320 | Kemira Oyj | Retention chemical |

Dynamic sheet former tests were performed as follows:

Sheets of paper or board with a grammage of approximately 100 g/m$^2$ were made using a Dynamic Sheer Former (A.D.F supplied by Techpap SAS, France) with the wire speed 1400 m/s. Sheet dimension was 25×92 cm and dryness of the sheet was 10-15%. Pulp suspension was formed in a mixing chest and microfibrillated cellulose material was added. Suspension was mixed for 30 seconds after which other chemicals were added in 10 s intervals. Retention polymers, Chem4 with dosage of 400 g/ton and Chem5 with dosage of 320 g/ton, were added last, 20 s and 10 s before the start of sheet making. The obtained sheet was couched on a roll press at 2 bar, pressed between blotting paper for 5 minutes at 10 bar in a plate press. Thereafter the sheet was dried restrained in a STFI dryer at 140° C. for 9 minutes. The sheets were conditioned in a climate room according to ISO 187:1990.

The sheet properties were measured according to the standards listed in Table 4.

TABLE 4

Tested sheet properties.

| Measured sheet property | Standard | Unit |
|---|---|---|
| Grammage | ISO 536: 2012 | g/m$^2$ |
| Thickness | ISO 534: 2011 | μm |
| Density | ISO 534: 2011 | g/cm$^3$ |
| Bulk | ISO 534: 2011 | cm$^3$/g |
| Air Permeance Bendtsen method | ISO 5636-3: 2013 | ml/min |
| Tensile Index CD | ISO 1924-3: 2005 | Nm/g |
| Tensile Energy Absorption Index CD | ISO 1924-3: 2005 | Nm/g |
| Z-strength | ISO 15754: 2009 | KPa |
| Burst strength | ISO 2759: 2014 | KPa |
| Short-Span Compressive Test (SCT) | ISO 9895: 2008 | Nm/g |

The obtained results are summarized in Tables 5 and 6. Dosage of Chem1 is given as kg/ton.

TABLE 5

Results for furnish comprising OCC pulp.

| | Formulation, Addition Order | Dose of Chem1 [kg/ton] | Bulk | Density | Grammage | Tensile Index (CD) | SCT (CD) | Burst (kPa) | Tensile energy absorption index (CD) J/kg | Air permeability |
|---|---|---|---|---|---|---|---|---|---|---|
| KP1 Ref. | Chem4 + Chem5 | — | 1.56 | 0.64 | 90.06 | 18.48 | 1.28 | 209.142 | 257.73 | 177.00 |
| KP3 | Chem1 | 0.5 | 1.59 | 0.63 | 91.47 | 18.91 | 1.39 | 220.489 | 277.30 | 186.17 |
| KP4 | Chem1 | 0.9 | 1.57 | 0.64 | 91.87 | 19.72 | 1.43 | 225.947 | 266.87 | 166.67 |
| KP5 | Chem1 | 1.25 | 1.56 | 0.64 | 91.23 | 20.10 | 1.50 | 238.602 | 279.03 | 152.33 |
| KP6 | MFC42 + Chem1 | 0.1 | 1.55 | 0.64 | 92.39 | 20.34 | 1.47 | 220.347 | 258.20 | 113.00 |
| KP7 | MFC42 + Chem1 | 0.3 | 1.56 | 0.64 | 91.10 | 20.58 | 1.44 | 229.513 | 266.41 | 115.17 |
| KP8 | MFC42 + Chem1 | 0.5 | 1.55 | 0.65 | 92.67 | 21.02 | 1.50 | 241.478 | 275.32 | 113.17 |
| KP9 | MFC41 + Chem1 | 0.5 | 1.54 | 0.65 | 93.72 | 20.42 | 1.53 | 233.097 | 267.52 | 105.58 |
| KP10 | MFC41 + Chem1 | 1 | 1.53 | 0.65 | 93.13 | 20.78 | 1.55 | 240.025 | 257.65 | 100.27 |
| KP11 | MFC41 + Chem1 | 1.5 | 1.53 | 0.66 | 95.53 | 21.24 | 1.61 | 244.868 | 283.32 | 90.78 |
| KP12 | MFC43 + Chem1 | 1 | 1.53 | 0.65 | 93.29 | 20.25 | 1.54 | 244.878 | 327.02 | 118.67 |
| KP13 | MFC43 + Chem1 | 1.5 | 1.54 | 0.65 | 93.54 | 22.42 | 1.63 | 250.261 | 304.74 | 110.83 |
| KP14 | MFC43 + Chem1 | 2 | 1.53 | 0.65 | 93.32 | 22.65 | 1.63 | 246.572 | 356.67 | 104.28 |

TABLE 6

Results for furnish comprising Kraft pulp.

| | Formulation Addition Order | Dose of Chem1 [kg/ton] | Bulk | Density | Grammage | Tensile Index (CD) | SCT (CD) | Burst (kPa) | Tensile energy absorption index (CD) J/kg | Air permeability |
|---|---|---|---|---|---|---|---|---|---|---|
| KP1 Ref. | Chem4 + Chem5 | — | 1.44 | 0.69 | 96.79 | 43.97 | 2.52 | 526.931 | 706.67 | 206.33 |
| KP3 | Chem1 | 0.5 | 1.44 | 0.69 | 98.26 | 47.66 | 2.71 | 557.644 | 890.10 | 172.67 |
| KP4 | Chem1 | 0.9 | 1.42 | 0.71 | 100.97 | 50.67 | 2.82 | 586.580 | 943.34 | 149.50 |
| KP5 | Chem1 | 1.25 | 1.43 | 0.70 | 100.36 | 51.26 | 2.84 | 614.527 | 957.00 | 159.17 |
| KP6 | MFC42 + Chem1 | 0.1 | 1.44 | 0.70 | 99.99 | 48.82 | 2.77 | 598.092 | 832.06 | 129.33 |
| KP7 | MFC42 + Chem1 | 0.3 | 1.43 | 0.70 | 99.43 | 50.59 | 2.71 | 611.063 | 909.70 | 112.95 |

TABLE 6-continued

Results for furnish comprising Kraft pulp.

| | Formulation Addition Order | Dose of Chem1 [kg/ton] | Bulk | Density | Grammage | Tensile Index (CD) | SCT (CD) | Burst (kPa) | Tensile energy absorption index (CD) J/kg | Air permeability |
|---|---|---|---|---|---|---|---|---|---|---|
| KP8 | MFC42 + Chem1 | 0.5 | 1.43 | 0.70 | 98.86 | 51.30 | 2.75 | 590.799 | 945.06 | 123.92 |
| KP9 | MFC41 + Chem1 | 0.5 | 1.38 | 0.73 | 102.34 | 48.76 | 2.90 | 612.385 | 909.53 | 91.88 |
| KP10 | MFC41 + Chem1 | 1 | 1.39 | 0.72 | 101.99 | 49.23 | 2.98 | 605.866 | 866.32 | 95.97 |
| KP11 | MFC41 + Chem1 | 1.5 | 1.39 | 0.72 | 101.76 | 51.24 | 3.06 | 640.495 | 878.52 | 82.70 |
| KP12 | MFC43 + Chem1 | 1 | 1.40 | 0.71 | 101.09 | 51.31 | 2.99 | 599.390 | 870.42 | 89.32 |
| KP13 | MFC43 + Chem1 | 1.5 | 1.40 | 0.72 | 103.24 | 51.74 | 2.82 | 626.951 | 964.08 | 96.30 |
| KP14 | MFC43 + Chem1 | 2 | 1.43 | 0.70 | 100.96 | 57.15 | 3.14 | 645.812 | 1113.72 | 71.68 |

Rapid Kothen sheet forming tests were performed as follows:

Hand sheets were formed with Rapid Kothen sheet former according to standard ISO 5269/2. The pulp suspension was stirred at a constant stirring rate. Microfibrillated parenchymal cellulose material, dose 20 kg/t, and a synthetic cationic polymer was added into the suspension. Stirring of furnish was performed at 1000 rpm with propeller mixer. All sheets were dried in vacuum dryer 5 min at 1000 mbar pressure and at 92° C. temperature. After drying the sheets were pre-conditioned for 24 h at 23° C. in 50% relative humidity. Sheet basis weight was 100 g/m$^2$ in air conditioned state. Basis weight was adjusted by retention polymer dosage 100 g/t for kraft pulp and 300 g/t for OCC, to keep the retention constant.

The results are summarized in Tables 7 and 8.

TABLE 7

Rapid Kothen sheet test results for OCC furnish.

| | Formulation, Addition Order | Chem1/Chem2 dosage | Bulk | Density | Grammage | Tensile Index | Z-strength | SCT | Burst (kPa) | Tensile energy absortion index J/kg | Air permeability |
|---|---|---|---|---|---|---|---|---|---|---|---|
| KP1 Ref. | Chem3 | — | 1.66 | 0.60 | 97.38 | 26.74 | 586.4 | 1.89 | 157.370 | 319.84 | 359.00 |
| KP2 Ref. | Chem1 + Chem3 | 1.5 | 1.63 | 0.61 | 99.88 | 27.84 | 633.0 | 1.99 | 172.038 | 343.56 | 382.50 |
| KP3 Ref. | Chem1 + Chem3 | 3 | 1.64 | 0.61 | 101.34 | 29.33 | 644.3 | 2.13 | 170.767 | 399.92 | 364.24 |
| KP6 Ref. | Chem2 + Chem3 | 1.5 | 1.60 | 0.63 | 100.64 | 27.85 | 619.7 | 2.03 | 175.741 | 365.72 | 290.50 |
| KP7 Ref. | Chem2 + Chem3 | 3 | 1.61 | 0.62 | 99.67 | 29.30 | 636.7 | 2.14 | 174.800 | 389.81 | 295.50 |
| KP8 | Chem1 + MFC41 + Chem3 | 1.5 | 1.60 | 0.62 | 102.18 | 30.85 | 608.0 | 2.16 | 180.983 | 436.65 | 202.75 |
| KP9 | Chem1 + MFC41 + Chem3 | 3 | 1.65 | 0.61 | 102.60 | 29.85 | 663.6 | 2.24 | 193.854 | 396.37 | 214.75 |
| KP12 | Chem2 + MFC41 + Chem3 | 1.5 | 1.62 | 0.62 | 99.91 | 28.38 | 627.8 | 2.11 | 183.433 | 386.70 | 200.75 |
| KP13 | Chem2 + MFC41 + Chem3 | 3 | 1.59 | 0.63 | 99.54 | 29.34 | 638.5 | 2.18 | 188.313 | 381.51 | 191.75 |
| KP14 | Chem1 + MFC42 + Chem3 | 1.5 | 1.62 | 0.62 | 101.94 | 28.99 | 626.2 | 2.24 | 186.599 | 392.86 | 213.75 |
| KP15 | Chem1 + MFC42 + Chem.3 | 3 | 1.60 | 0.62 | 103.43 | 30.94 | 688.2 | 2.29 | 188.590 | 440.73 | 227.25 |
| KP18 | Chem2 + MFC42 + Chem3 | 1.5 | 1.59 | 0.63 | 100.07 | 29.63 | 636.3 | 2.09 | 179.823 | 419.41 | 200.75 |
| KP19 | Chem2 + MFC42 + Chem3 | 3 | 1.60 | 0.63 | 100.23 | 29.88 | 658.1 | 2.17 | 195.299 | 390.23 | 197.50 |
| KP20 | MFC41 + Chem1 + Chem3 | 1.5 | 1.59 | 0.63 | 101.91 | 28.91 | 636.5 | 2.14 | 186.014 | 370.07 | 219.00 |
| KP21 | MFC41 + Chem1 + Chem3 | 3 | 1.59 | 0.63 | 98.49 | 30.69 | 675.1 | 2.11 | 201.887 | 450.35 | 247.50 |

TABLE 8

Rapid Kothen sheet test results for Kraft furnish.

| | Formulation, Addition Order | Chem1/Chem2 dosage | Bulk | Density | Grammage | Tensile Index | Z-strength | SCT | Burst (kPa) | Tensile energy absorption index J/kg | Air permeability |
|---|---|---|---|---|---|---|---|---|---|---|---|
| KP1 | Chem3 | — | 1.61 | 0.62 | 97.52 | 69.77 | 778.7 | 3.43 | 559.077 | 1236.288 | 469.00 |
| KP2 | Chem1 + Chem3 | 1.5 | 1.54 | 0.65 | 98.40 | 74.61 | 839.5 | 3.50 | 564.575 | 1392.813 | 528.50 |
| KP3 | Chem1 + Chem3 | 3 | 1.55 | 0.64 | 98.85 | 81.68 | 843.9 | 3.75 | 576.244 | 1646.625 | 651.25 |
| KP6 | Chem2 + Chem3 | 1.5 | 1.54 | 0.65 | 100.94 | 72.22 | 788.0 | 3.57 | 602.963 | 1267.589 | 438.00 |
| KP7 | Chem2 + Chem3 | 3 | 1.52 | 0.66 | 101.28 | 77.35 | 802.7 | 3.52 | 583.539 | 1532.619 | 486.50 |
| KP8 | Chem1 + MFC42 + Chem 3 | 1.5 | 1.54 | 0.65 | 103.18 | 70.41 | 793.5 | 3.73 | 589.173 | 1228.992 | 319.75 |
| KP9 | Chem1 + MFC42 + Chem3 | 3 | 1.56 | 0.64 | 102.33 | 74.73 | 802.2 | 3.45 | 612.693 | 1488.168 | 373.75 |
| KP12 | Chem2 + MFC42 + Chem3 | 1.5 | 1.53 | 0.66 | 99.77 | 75.57 | 811.4 | 3.55 | 571.593 | 1487.542 | 326.00 |
| KP13 | Chem2 + MFC42 + Chem3 | 3 | 1.52 | 0.66 | 100.59 | 80.75 | 831.8 | 3.67 | 612.522 | 1627.861 | 316.00 |
| KP14 | MFC42 + Chem1 Chem3 | 1.5 | 1.53 | 0.65 | 97.39 | 76.82 | 852.7 | 3.64 | 563.274 | 1526.204 | 342.00 |
| KP15 | MFC42 + Chem1 Chem3 | 3 | 1.54 | 0.65 | 98.61 | 79.80 | | 3.64 | 615.129 | 1561.072 | 417.50 |

Example 4

Performance of the Strength Composition Comprising Microfibrillated Parenchymal Cellulose Material Performance of strength composition comprising microfibrillated parenchymal cellulose material was compared to a reference strength composition comprising wood based microfibrillated cellulose. Hand sheets were formed according to Rapid Kothen procedure, as described above and using OCC furnish. Amount of cationic polymer (Chem1, Chem2) in the strength composition was 3 kg/t pulp. Amount of retention polymer (Chem3) was 300 g/t pulp.

The results are summarised in Table 9.

TABLE 9

Results of Example 4.

| Test No | Formulation, Addition Order | Bulk | Density | Grammage | Tensile Index | Z-strength | SCT | Burst | Ash | Air permeability |
|---|---|---|---|---|---|---|---|---|---|---|
| 1 | Chem3 | 1.66 | 0.60 | 99.92 | 26.04 | 548.2 | 1.86 | 236.72 | 17.4 | 369.8 |
| 2 | Chem1 + Chem3 | 1.65 | 0.60 | 101.62 | 27.43 | 583.1 | 2.01 | 259.20 | 17.6 | 437.3 |
| 3 | Chem2 + Chem3 | 1.65 | 0.61 | 99.98 | 28.49 | 593.0 | 2.03 | 267.99 | 17.2 | 342.3 |
| 4 | Chem1 + RefMFC + Chem3 | 1.67 | 0.60 | 101.43 | 30.58 | 595.1 | 2.17 | 305.14 | 16.6 | 268.0 |
| 5 | Chem2 + RefMFC + Chem3 | 1.69 | 0.59 | 99.93 | 31.08 | 622.9 | 2.14 | 301.80 | 16.5 | 257.5 |
| 6 | Chem1 + MFC38 + Chem3 | 1.66 | 0.60 | 98.30 | 31.63 | 624.0 | 2.16 | 320.99 | 17.6 | 235.8 |
| 7 | Chem2 + MFC38 + Chem3 | 1.61 | 0.62 | 100.77 | 32.17 | 645.9 | 2.24 | 313.75 | 17.0 | 197.5 |

From these results it can be seen that strength composition according to the present invention and comprising microfibrillated parenchymal cellulose material gave higher enhancement especially in Z-strength and burst values compared to the reference.

Example 5

Performance of the Strength Composition Comprising Microfibrillated Parenchymal Cellulose Material Performance of a strength composition comprising cationic synthetic polymer and microfibrillated parenchymal cellulose material was tested in pilot paper machine using a dry recycled fibre furnish. The strength system comprised microfibrillated parenchymal cellulose added in amount of 20 kg/ton dry pulp and cationic polymer Chem2, as defined above, added in amount of 3 kg/ton dry pulp.

The stock used for the test was prepared as follows: ca. 75 kg dry paper was slushed into 3 m³ local tap water, temperature 8-10° C.

Targeted white water conditions were: conductivity: 8000 mS/cm, calcium level 800 ppm $Ca^{2+}$, charge level: 1500 meq/l.

The anionic trash levels in stock were adjusted by addition of calcium propionate (Caldic, Espoo, Finland), $Na_2SO_4$ (Algol, Espoo, Finland) and anionic carboxmethyl cellulose Staflo Exlo (Akzo Nobel, Gothenburg, Sweden). These additions were made to the pulp as follows: first 3.72 g/l of calcium propionate is added to reach conductivity of 3500 mS/cm, followed by addition of 4.67 g/l of $Na_2SO_4$ and 3.5 mg/l of carboxymethyl cellulose, in this order.

The prepared paper stock was subjected to mixing, pumping and a mild refining (resembling a deflaking step) at 2.25 weigh-% feed consistency in an Esser-Wysch 13A refiner, 4.4 kWh/t.

The stock was fed to a pilot paper machine and diluted to headbox consistency with white water. The volume of the white water was ca 8.5 m³ per pulped batch as follows: pulper 2 m³; four mixing chests 5 m³; white water circulation ca. 1.5 m³.

The produced stock was formed into a web on the wire, speed 30 m/min, while passing four vacuum boxes, one vacuum roll and two nips, 50 MPa and 70 MPa and 11 drying cylinders having average effect of 120 kW at a production rate of ca. 90 kg/h.

The results of Example 5 are summarized in Table 10.

TABLE 10

| Strength enhancement measured in %. | | | |
|---|---|---|---|
| | CHEM 2 | MFC | CHEM 2 + MFC |
| Tensile index, GM, % | −2 | 6 | 8 |
| TEA index, GM, % | 4 | 14 | 20 |
| SCT index, GM, % | 2 | 6 | 7 |
| Burst index, % | 0 | 5 | 7 |
| CMT30 index MD, % | −5 | 0 | 2 |
| Z-strength, % | 5 | 12 | 11 |

Although certain embodiments and examples have been described in detail above, those having ordinary skill in the art will clearly understand that many modifications are possible in the embodiments and examples without departing from the teachings thereof. All such modifications are intended to be encompassed within the below claims of the invention.

The invention claimed is:

1. A method for producing paper or board, comprising:
   obtaining a thick stock comprising cellulose fibres;
   forming a fibrous web; and
   drying the fibrous web,
   wherein
   a strength agent system, comprising at least one synthetic or natural polymer or their mixture and a microfibrillated parenchymal cellulose material originating from non-wood sources is added to the thick stock, and
   wherein a cationic retention polymer, which is a cationic polyacrylamide having an average molecular weight of 4,000,000-18,000 000 Da is added to the stock after the addition of the strength agent system.

2. The method according to claim 1, wherein the microfibrillated parenchymal cellulose material originates from vegetables; fruits; cellulose pith; and mixtures thereof.

3. The method according to claim 2, wherein the microfibrillated parenchymal cellulose material originates from vegetables selected from sugar beet pulp, potato pulp, cassava pulp, sweet potato and any mixtures thereof.

4. The method according to claim 1, wherein the microfibrillated parenchymal cellulose material is obtained by mechanical treatment, without preceding treatment steps, which are selected from oxidation, extraction and/or washing.

5. The method according to claim 4, wherein the mechanical treatment is homogenization.

6. The method according to claim 1, wherein the microfibrillated parenchymal cellulose material has:
   a Brookfield viscosity of at least 10 Pas, measured at concentration of 1.0 weight-% at 100 rpm shear rate, and/or
   a turbidity value less than 1000 NTU, measured at 0.1 weight-% concentration, and/or
   a net charge in a range of −0.001-1.99 meq/g, at pH 7.5.

7. The method according to claim 1, wherein the Brookfield viscosity of the microfibrillated parenchymal cellulose material is in a range of 500 2000 Pas.

8. The method according to claim 1, wherein the turbidity of the microfibrillated parenchymal cellulose material may be in a range 375-525 NTU.

9. The method according to claim 1, wherein the strength agent system is added in such amount that the microfibrillated parenchymal cellulose material is added in amount of 1-100 kg, given as dry per ton of dry solids of the fibre stock.

10. The method according to claim 9, wherein the strength agent system is added in such amount that the microfibrillated parenchymal cellulose material is added in amount of 5-70 kg.

11. The method according to claim 1, wherein the strength agent system comprises 50-99.9 weight-%, of microfibrillated parenchymal cellulose material, calculated from the dry solids content.

12. The method according to claim 11, wherein the strength agent system comprises 70-99.9 weight-% of microfibrillated parenchymal cellulose material, calculated from the dry solids content.

13. The method according to claim 1, wherein that the strength agent system comprises a natural polymer, which is selected from a group consisting of cationic or amphoteric starch, chitin, guargum, carboxymethyl cellulose, and any mixture thereof.

14. The method according to claim 1, wherein the strength agent is a synthetic polymer selected from cationic polyacrylamide (C-PAM), glyoxalated poly-acrylamide (G-PAM), amphoteric polyacrylamide, polydiallyldimethylammonium chloride (poly-DADMAC), polyacrylic amide (PARE), polyvinyl amine (PVAm), polyethylene oxide (PEO), polyethyleneimine (PEI) or a mixture of two or more of these polymers.

15. The method according to claim 14, wherein the average molecular weight of the synthetic polymer is in a range 100,000-20,000,000 g/mol.

16. The method according to claim 14, wherein the synthetic polymer is a cationic synthetic polymer which has a charge density of 0.5-2 meq/g.

17. The method according to claim 14, wherein the synthetic polymer is a cationic synthetic polymer which is a copolymer of methacrylamide or acrylamide and at least one cationic monomer.

18. The method according to claim 1, wherein the cationic retention polymer is cationic polyacrylamide having an average molecular weight of 4,000,000 12,000,000 Da and/or having a charge density of 0.2-2.5 meq/g.

19. The method according to claim 1, wherein the stock comprising cellulose fibres is obtained by using furnish from kraft pulping, chemithermomechanical pulping or by repulping recycled fibres.

20. A paper or board product, having a density in a range of 150-800 kg/m$^3$, produced by a method according to claim 1.

* * * * *